United States Patent [19]

Knauf et al.

[11] Patent Number: 5,759,409
[45] Date of Patent: Jun. 2, 1998

[54] SEPARATION OF WATER FROM CRUDE OIL AND OIL DEMULSIFIERS USED FOR THIS PURPOSE

[75] Inventors: Wolfgang Knauf, Limburgerhof; Knut Oppenländer; Wilhelmus Slotman, both of Ludwigshafen, all of Germany

[73] Assignee: BASF Aktiengesellschaft, Ludwigshafen, Germany

[21] Appl. No.: 737,925

[22] PCT Filed: May 19, 1995

[86] PCT No.: PCT/EP95/01901

§ 371 Date: Dec. 2, 1996

§ 102(e) Date: Dec. 2, 1996

[87] PCT Pub. No.: WO95/33018

PCT Pub. Date: Dec. 7, 1995

[30] Foreign Application Priority Data

May 30, 1994 [DE] Germany ............... 44 18 800.5

[51] Int. Cl.$^6$ ........................ B01D 17/05
[52] U.S. Cl. ............... 210/708; 210/728; 210/729; 210/734; 210/735; 252/336; 252/338; 252/358; 208/188
[58] Field of Search ............... 210/708, 729, 210/734, 735, 749, 925, 728; 252/331, 358, 336, 338; 208/188

[56] References Cited

U.S. PATENT DOCUMENTS

| | | | |
|---|---|---|---|
| 2,964,478 | 12/1960 | Monson | 252/331 |
| 3,907,701 | 9/1975 | Liebold et al. | 252/358 |
| 4,306,981 | 12/1981 | Blair, Jr. | 210/708 |
| 4,326,983 | 4/1982 | Blair, Jr. | 210/708 |
| 4,326,984 | 4/1982 | Blair, Jr. | 210/708 |
| 4,537,701 | 8/1985 | Oppenlaender et al. | 210/708 |
| 4,551,239 | 11/1985 | Merchant et al. | 210/729 |
| 5,302,296 | 4/1994 | Evain et al. | 210/708 |
| 5,401,439 | 3/1995 | Elfers et al. | 210/708 |
| 5,445,765 | 8/1995 | Elfers et al. | 210/708 |

FOREIGN PATENT DOCUMENTS

| | | | |
|---|---|---|---|
| 0333141 | 9/1989 | European Pat. Off. | 210/708 |
| 2006804 | 1/1990 | Japan | 210/708 |

Primary Examiner—Peter A. Hruskoci
Assistant Examiner—Betsey J. Morrison
Attorney, Agent, or Firm—Oblon, Spivak, McClelland, Maier & Neustadt, P.C.

[57] ABSTRACT

Water is separated from crude oil by a process in which the oil demulsifier used is a mixture of A) compounds which have demulsifying activity and are of the structure type of the
  (a) polyethyleneimine alkoxylate,
  (b) mono- or oligoamine alkoxylate,
  (c) alkoxylated alkylphenol/formaldehyde resins,
  (d) alkoxylated amine-modified alkylphenol/formaldehyde resins,
  (e) co- or terpolymers of alkoxylated acrylates or methacrylates with vinyl compounds,
  (f) condensates of mono- or oligoamine alkoxylates, dicarboxylic acids and alkylene oxide block copolymers, where these condensates may furthermore be completely or partially quaternized at the nitrogen atoms, or
  (g) compounds (a) to (f) reacted with crosslinking agents and B) as a demulsifying assistant, a polyalkylene glycol ether which has no demulsifying activity and is of the general formula I or II $$R^1[(OA^1)_a\text{—OH}]_n \quad (I)$$

$$H\text{—}(OA^1)_b\text{—}(OA^2)_c\text{—}(OA^3)_d\text{—OH} \quad (II)$$

where $R^1$ is a monovalent to decavalent $C_1$–$C_{20}$ alkyl group, phenyl group or alkylphenyl group where the alkyl radical is of 1 to 20 carbon atoms, $A^1$ to $A^3$ are each a 1,2-alkylene group of 2 to 4 carbon atoms or a phenylethylene group, n is from 1 to 10, a is from 1 to 50 and b, c and d are each from 0 to 50, the sum b+c+d being greater than 3.

3 Claims, No Drawings

SEPARATION OF WATER FROM CRUDE OIL AND OIL DEMULSIFIERS USED FOR THIS PURPOSE

BACKGROUND OF THE INVENTION

1. Field of the Invention

The present invention relates to an improved process for separating water from crude oil. The present invention furthermore relates to the oil demulsifiers used for this purpose.

2. Description of the Background

In the production of crude oils, an increasing amount of water is simultaneously extracted with increasing exploitation of the deposits. Surfactants present in the crude oils emulsify the major part of the water, stable water-in-oil emulsions being formed. The emulsified water may account for from 0.1 to more than 90% by weight of the total emulsion. Salts which lead to corrosion problems in the further processing of the crude oil in the refinery may be dissolved in the emulsion water. Before transport, the emulsion water must therefore be separated off or reduced below an acceptable concentration. This is generally done by adding oil demulsifiers, separation being facilitated and accelerated by heating the crude oil.

The crude oils differ greatly in their composition depending on their origin. The natural emulsifiers present in the crude oils furthermore have a complicated chemical structure, so that selective oil demulsifiers must be developed to overcome their effect. Owing to the opening up of new oil fields and changed production conditions in older fields, there is a constant need for novel demulsifiers which result in a more rapid separation into water and oil and very small amounts of residual water and residual salts.

EP-A 549 918 discloses oil demulsifiers based on an alkoxylate, for example monohydric or dihydric alcohols, such as ethylene glycol, diethylene glycol or butylene glycol, reacted with from 3 to 100 mol of ethylene oxide, propylene oxide or butylene oxide per hydroxyl group. These alcohol alkoxylates having demulsifying activity may also be used together with oxyalkylated polyalkylenepolyamines, which also have demulsifying activity. However, the known oil demulsifiers and mixtures of oil demulsifiers frequently do not fully meet the requirements since separation of the emulsion into on-spec oil and water having a very small residual oil content either takes too long or requires excessively large doses of the demulsifier.

It is an object of the present invention to provide oil demulsifiers which permit highly quantitative separation of the emulsion into oil and water in a very short time, ie. which exhibit good efficiency even in a small dose.

Since, for economic and ecological reasons, very substantial exploitation of the oil fields and complete separation of the residual oil from the water are becoming increasingly important, the achievement of this object is of additional importance.

SUMMARY

We have found that this object is achieved by a process for separating water from crude oil, wherein the oil demulsifier used is a mixture of A) compounds which have demulsifying activity and are of the structure type of the
 (a) polyethyleneimine alkoxylate,
 (b) mono- or oligoamine alkoxylate,
 (c) alkoxylated alkylphenol/formaldehyde resins,
 (d) alkoxylated amine-modified alkylphenol/formaldehyde resins,
 (e) co- or terpolymers of alkoxylated acrylates or methacrylates with vinyl compounds,
 (f) condensates of mono- or oligoamine alkoxylates, dicarboxylic acids and alkylene oxide block copolymers, where these condensates may furthermore be completely or partially quaternized at the nitrogen atoms, or
 (g) compounds (a) to (f) reacted with crosslinking agents and B) as a demulsifying assistant, a polyalkylene glycol ether which has no demulsifying activity and is of the general formula I or II

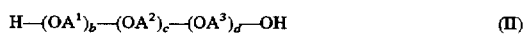

where $R^1$ is a monovalent to decavalent $C_1$–$C_{20}$ alkyl group, phenyl group or alkylphenyl group where the alkyl radical is of 1 to 20 carbon atoms, $A^1$, $A^2$, and $A^3$ are each a 1,2-alkylene group of 2 to 4 carbon atoms or a phenylethylene group, n is from 1 to 10, a is from 1 to 50 and b, c and d are each from 0 to 50, the sum b+c+d being greater than 3.

DETAILED DESCRIPTION OF THE INVENTION

Compounds A having demulsifying activity which are preferably used as oil demulsifiers are known substances of the following structure types:

(a) polyethyleneimine alkoxylates of the general formula III

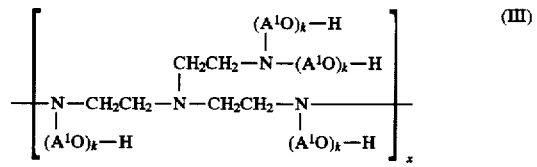

where $A^1$ has the abovementioned meanings, k is from 1 to 200, preferably from 5 to 150, in particular from 10 to 100, and x is from 10 to 2,500, preferably from 40 to 1,200;

(b) monoamine alkoxylates of the general formula IV or oligoamine alkoxylates of the general formula V

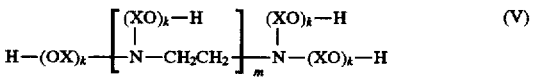

where $R^2$ is straight-chain or branched $C_1$–$C_{30}$ alkyl, straight-chain or branched $C_2$–$C_{30}$ alkenyl or phenylalkyl where the alkyl group is of 1 to 20 carbon atoms, $R^3$ is a group of the formula —(XO)$_k$—H or has the meanings of $R^2$, X is one 1,2-alkylene group or different 1,2-alkylene groups of 2 to 4 carbon atoms, present in block form, k has the abovementioned meanings and m is from 1 to 10, preferably from 1 to 4;

(c) alkoxylated alkylphenol/formaldehyde resins of the general formula VI

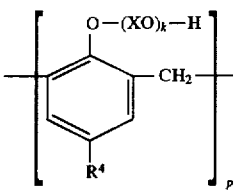
(VI)

where $R^4$ is straight-chain or branched $C_1$–$C_{20}$ alkyl, in particular $C_4$–$C_{12}$ alkyl, p is from 1 to 75, preferably from 2 to 40, and x and k have the abovementioned meanings;

(d) alkoxylated amine-modified alkylphenol/formaldehyde resins of the general formula VII

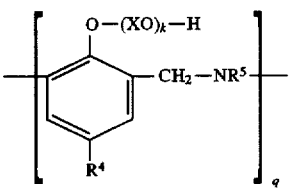
(VII)

where $R^5$ is hydrogen, $C_1$–$C_4$ alkyl or benzyl, q is from 1 to 100, preferably from 3 to 50, and $R^4$, X and k have the abovementioned meanings;

(e) co- and terpolymers of alkoxylated acrylates or methacrylates of the general formula VIII

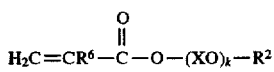
(VIII)

where $R^6$ is hydrogen or methyl and

X, k and $R^2$ have the abovementioned meanings, with vinyl compounds of the general formula IX

CHR$^7$=CR$^6$R$^8$ (IX)

where $R^6$ has the abovementioned meanings, $R^7$ is hydrogen or —COOH, —COOC$_2$H$_4$OH, —COOC$_2$H$_4$N(C$_2$H$_5$)$_2$, —CONH$_2$, —CN, Phenyl, —OCOCH$_3$, —CH$_2$OH, —NHCHO, —COOCH$_3$, —COOC$_2$H$_5$,

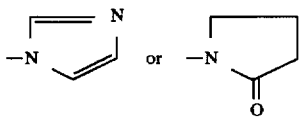

and $R^8$ is hydrogen or —COOH;

(f) condensates of mono- or oligoamine alkoxylates, dicarboxylic acids and alkylene oxide block copolymers of the general formula X

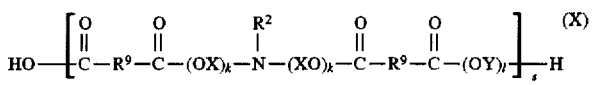
(X)

where $R^9$ is straight-chain or branched $C_1$–$C_{12}$ alkylene,

Y is one 1,2-alkylene group or different 1,2-alkylene groups of 2 to 4 carbon atoms, present in block form, l is from 1 to 200, preferably from 3 to 150, particularly from 5 to 100, s is from 2 to 80, preferably from 3 to 50, and X, k and $R^2$ have the abovementioned meanings, it being possible for the condensates X furthermore to be completely or partially quaternized by, for example, $C_1$–$C_4$ alkyl or benzyl at the nitrogen atoms;

(g) compounds (a) to (f) subsequently reacted with diisocyanates, dicarboxylic acids, formaldehyde, diglycidyl ethers, dicarboxylic anhydrides, epichlorohydrin, methylolphenols, dicarbonyl dihalides or urea as crosslinking agents in amounts usual for this purpose.

Mixtures of the stated compounds A having demulsifying activity may also be used, for example mixtures of the substances of the structure types (a)+(c), (a)+(d), (a)+(e), (a)+(f), (b)+(c), (b)+(e) or (b)+(f).

$A^1$, $A^2$, $A^3$ and X and Y are based on 1,2-alkylene oxides, such as butylene oxide, but especially ethylene oxide and propylene oxide, or on styrene oxide.

Examples of suitable straight-chain or branched monovalent alkyl radicals $R^1$, $R^2$, $R^4$ and $R^5$, which are referred to as $C_1$–$C_4$-alkyl, $C_1$–$C_{20}$-alkyl or $C_1$–$C_{30}$ alkyl radicals, are methyl, ethyl, n-propyl, isopropyl, n-butyl, isobutyl, sec-butyl, tert-butyl, n-pentyl, isopentyl, tert-pentyl, neopentyl, n-hexyl, n-heptyl, n-octyl, 2-ethylhexyl, n-nonyl, isononyl, n-decyl, n-undecyl, n-dodecyl, n-tridecyl, isotridecyl, n-tetradecyl, n-pentadecyl, n-hexadecyl, n-heptadecyl, n-octadecyl and n-eicosyl.

Examples of suitable polyvalent alkyl radicals $R^1$ are α,ω-alkylene radicals, glyceryl radicals, the pentaerythrityl radical or the like.

Particularly suitable radicals $R^4$ are $C_4$–$C_{12}$-alkyl radicals, such as tert-butyl, n-pentyl, n-octyl, n-nonyl, isononyl or n-dodecyl.

Examples of suitable straight-chain or branched $C_2$–$C_{30}$-alkenyl radicals $R^2$ are vinyl, allyl, methallyl, oleyl, linolyl and linolenyl.

Alkylphenyl groups $R^1$ where the alkyl radical is of 1 to 20 carbon atoms, are, for example, groups of the formula

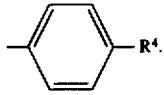

Phenylalkyl groups where the alkyl group is of 1 to 20 carbon atoms are, for example, benzyl, 2-phenylethyl, 3-phenylpropyl and 4-phenylbutyl.

Examples of compounds V are correspondingly alkoxylated ethylenediamine, diethylenetriamine, triethylenetetramine and tetraethylenepentamine.

Polymer demulsifiers of the structure type (e) are described in EP-A 264 841. Specific examples of such compounds are stated there.

The polyalkylene glycol ethers I which do not have demulsifying activity and are used as demulsifying assistants are alkoxylation products based on monohydric, dihydric or polyhydric alcohols or phenols. The functionality n of the alcohol or phenol is preferably from 1 to 5, in particular from 1 to 3, especially 1 or 2. The degree of alkoxylation a in the compounds I is preferably from 2 to 15, in particular from 3 to 10, and especially from 4 to 7.

Examples of compounds I are ethylene glycol or propylene glycol reacted with 2, 3, 4, 5, 6, 7, 8, 9 or 10 mol of ethylene oxide or propylene oxide, n-propanol, n-butanol, n-pentanol, n-hexanol, n-heptanol, n-octanol or 2-ethylhexanol, reacted with 1, 2, 3, 4 or 5 mol of ethylene oxide or propylene oxide, glycerol reacted with 3, 4, 5, 6, 7, 8, 9, 10, 11, 12, 13, 14 or 15 mol of ethylene oxide or propylene oxide and phenol, p-tert-butylphenol, p-pentylphenol, p-octylphenol, p-nonylphenol, p-isononylphenol or p-dodecylphenol reacted with 1, 2, 3, 4, 5, 6 or 7 mol of ethylene oxide or propylene oxide.

The block copolymers II which have no demulsifying activity and are used as demulsifying assistants possess total degrees of alkoxylation b+c+d of from 4 to 150, in particular from 7 to 100, especially from 10 to 75. Those having molecular weights of from 300 to 5,000, in particular from 600 to 4,500, especially from 1,000 to 4,100, are particularly preferred. Block copolymers II comprising a single block, eg. ethylene oxide or propylene oxide, comprising two blocks, eg. ethylene oxide+propylene oxide, or comprising three blocks, eg. ethylene oxide+propylene oxide+ethylene oxide or propylene oxide+ethylene oxide+propylene oxide, may be used.

The demulsifying assistants I used, and in particular II, may be amphiphilic, ie. having one end which is more hydrophilic and another end which is more hydrophobic, for example ethylene oxide/propylene oxide block copolymers, or nonamphiphilic, for example pure ethylene oxide block copolymers or pure propylene oxide block copolymers.

The demulsifying assistants B used according to the invention may be classed as having (virtually) no demulsifying activity and thus differ from the alkoxylates of similar structure which have demulsifying activity and are stated in the prior art, for example in EP-A 549 918. When used alone, the demulsifying assistants I and II do not effect separation of water from crude oil, as also demonstrated by the experimental examples described below.

The demulsifying assistants B described can be used generally in related technical fields, together with an actual demulsifier, for better and faster demulsification of water-in-oil emulsions.

In the novel process for separating water from crude oil, the components A and B are preferably used in a weight ratio of from 98:2 to 30:70, in particular from 95:5 to 40:60, especially from 90:10 to 50:50. The optimum ratio depends in each case on the chemical structure of the compounds A and B, but also on the crude oil used. In each case, the action spectrum passes through a maximum, which has a specific position for each system. With an overdose of B, this substance then acts only as a diluent and, based on the total amount of the mixture, the demulsifying action of the mixture of A and B declines.

The present invention also relates to an oil-demulsifying mixture of

A) compounds which have demulsifying activity and are of the structure type of the
  (a) polyethyleneimine alkoxylates,
  (b) mono- or oligoamine alkoxylates,
  (c) alkoxylated alkylphenol/formaldehyde resins,
  (d) alkoxylated amine-modified alkylphenol/formaldehyde resins,
  (e) co- or terpolymers of alkoxylated acrylates or methacrylates with vinyl compounds,
  (f) condensates of mono- or oligoamine alkoxylates, dicarboxylic acids and alkylene oxide block copolymers, it being possible for these condensates also to be completely or partially quaternized at the nitrogen atoms, or
  (g) compounds (a) to (f) reacted with crosslinking agents and B) as demulsifying assistants, polyalkylene glycol ethers which have no demulsifying activity and are of the general formula I or II

where $R^1$ is a monovalent to decavalent $C_1$-$C_{20}$-alkyl group, a phenyl group or an alkylphenyl group where the alkyl radical is of 1 to 20 carbon atoms, $A^1$, $A^2$, to $A^3$ are each a 1,2-alkylene group of 2 to 4 carbon atoms or a phenylethylene group, n is from 1 to 10, a is from 1 to 50 and b, c and d are each from 0 to 50, the sum b+c+d being greater than 3, with the exception of mixtures of the components (a) and I.

The demulsifier mixtures described are added to the crude oil emulsions advantageously in amounts of from 1 to 1,000 ppm, preferably from 5 to 200 ppm, in particular from 10 to 100 ppm, based on the weight of the emulsion to be demulsified, at from 20° to 80° C.

The demulsifier mixtures may also be used as solutions, because they are thus more readily meterable. Suitable solvents are mixtures of organic solvents (eg. methanol) with water or organic solvents alone, having boiling limits from 50° to 200° C., eg. toluene, xylenes, tetrahydrofurane, dioxane, lower alcohols and naphtha fractions boiling within the stated limits.

When solutions are used, they are advantageously brought to an active ingredient content (content of demulsifier mixture) of from 0.5 to 50% by weight. During demulsification, the solutions are preferably added to the crude oils at the wells (in the field). Demulsification then takes place at the temperature of the freshly extracted water-in-oil emulsion at a rate such that the emulsion can be broken on the way to the processing plant. There, it is separated into pure oil and salt water (formation water) without difficulties in an unheated or heated separator and possibly with the aid of an electric field.

USE EXAMPLES

The mixtures of demulsifier A and demulsifying assistant B were each added to 100 g of a crude oil emulsion, in the amounts stated in the tables below. The mixtures were stirred with a mechanical stirrer in a glass flask at 55° C. for 10 minutes at a stirrer speed of 500 rpm and were poured into a 100 ml glass cylinder. The glass cylinder was placed in a water bath at the stated test temperature and the water separation was observed in the course of 4 and 16 hours.

The tables below show the results of this bottle test with different demulsifying assistants B.

TABLE 1

| Demulsifier (A1): | polyethyleneimine reacted with propylene oxide, according to Example 2 in EP-A 549 918 (p. 6, lines 48 to 52) |
| --- | --- |
| Demulsifying assistant (B1): | commercial propylene oxide/ethylene oxide block copolymer having an average molecular weight of 1,900 and an ethylene oxide content of about 30% by weight |
| Crude oil emulsion: | North German I (Water content: about 45% by weight) |
| Test temperature: | 50° C. |
| Added amount of mixtures of A1 and B1: | 100 ppm in each case |

| Mixtures of | | Separated amount of formation water [ml] | | | | | | | |
| --- | --- | --- | --- | --- | --- | --- | --- | --- | --- |
| A1 [% by weight] | B1 [% by weight] | 10 min | 20 min | 30 min | 45 min | 60 min | 2 h | 4 h | 16 h |
| 100 | 0 | 0 | 1 | 2 | 4 | 10 | 25 | 40 | 45 |
| 90 | 10 | 0 | 1 | 2 | 4 | 11 | 25 | 45 | 45 |
| 80 | 20 | 2 | 5 | 10 | 31 | 40 | 45 | 45 | 45 |
| 70 | 30 | 5 | 13 | 24 | 40 | 45 | 45 | 45 | 45 |
| 60 | 40 | 3 | 8 | 12 | 25 | 33 | 39 | 43 | 45 |
| 50 | 50 | 0 | 0 | 3 | 10 | 14 | 20 | 32 | 40 |
| 0 | 100 | 0 | 0 | 0 | 1 | 1 | 2 | 2 | 2 |

TABLE 2

| Demulsifier (A1): | as in Table 1 |
| --- | --- |
| Demulsifying assistant (B1): | as in Table 1 |
| Crude oil emulsion: | North German II (water content: about 38% by weight) |
| Test temperature: | 50° C. |
| Added amount of mixtures of A1 and B1: | 100 ppm in each case |

| Mixtures of | | Separated amount of formation water [ml] | | | | | | |
| --- | --- | --- | --- | --- | --- | --- | --- | --- |
| A1 [% by weight] | B1 [% by weight] | 10 min | 20 min | 30 min | 45 min | 60 min | 2 h | 4 h |
| 100 | 0 | 0 | 0 | 2 | 2 | 3 | 14 | 38 |
| 90 | 10 | 0 | 0 | 0 | 1 | 2 | 15 | 38 |
| 80 | 20 | 0 | 0 | 1 | 6 | 10 | 27 | 38 |
| 70 | 30 | 0 | 3 | 11 | 30 | 37 | 38 | 38 |
| 60 | 40 | 8 | 22 | 25 | 27 | 29 | 33 | 37 |
| 50 | 50 | 1 | 1 | 2 | 5 | 10 | 27 | 36 |
| 0 | 100 | 0 | 0 | 0 | 0 | 0 | 0 | 5 |

TABLE 3

| Demulsifier (A1): | as in Table 1 |
| --- | --- |
| Demulsifying assistant (B2): | commercial propylene oxide block copolymer having an average molecular weight of 4,000 |
| Crude oil emulsion: | North German I (water content: about 45% by weight) |
| Test temperature: | 50° C |
| Added amount of mixtures of A1 and B2: | 75 ppm in each case |

| Mixtures of | | Separated amount of formation water [ml] | | | | | | |
| --- | --- | --- | --- | --- | --- | --- | --- | --- |
| A1 [% by weight] | B2 [% by weight] | 10 min | 20 min | 30 min | 45 min | 60 min | 2 h | 4 h |
| 100 | 0 | 0 | 1 | 2 | 5 | 10 | 46 | 46 |
| 90 | 10 | 0 | 1 | 2 | 5 | 10 | 44 | 44 |
| 80 | 20 | 0 | 1 | 2 | 6 | 10 | 44 | 44 |
| 70 | 30 | 0 | 2 | 4 | 10 | 30 | 45 | 46 |
| 60 | 40 | 0 | 1 | 2 | 7 | 12 | 44 | 46 |
| 50 | 50 | 0 | 1 | 3 | 5 | 8 | 44 | 45 |
| 0 | 100 | 0 | 0 | 1 | 1 | 1 | 1 | 3 |

TABLE 4

| Demulsifier (A1): | as in Table 1 |
| --- | --- |
| Demulsifying assistant (B2): | as in Table 3 |
| Crude oil emulsion: | North German II (water content: about 38% by weight) |
| Test temperature: | 50° C. |
| Added amount of mixtures of A1 and B2: | 100 ppm in each case |

| Mixtures of | | Separated amount of formation water [ml] | | | | | | |
| --- | --- | --- | --- | --- | --- | --- | --- | --- |
| A1 [% by weight] | B1 [% by weight] | 10 min | 20 min | 30 min | 45 min | 60 min | 2 h | 4 h |
| 100 | 0 | 3 | 4 | 9 | 15 | 21 | 29 | 30 |
| 90 | 10 | 3 | 10 | 16 | 22 | 28 | 32 | 32 |
| 80 | 20 | 2 | 5 | 7 | 11 | 25 | 28 | 35 |
| 70 | 30 | 8 | 15 | 24 | 30 | 33 | 36 | 38 |
| 60 | 40 | 4 | 7 | 13 | 21 | 28 | 33 | 36 |
| 50 | 50 | 3 | 6 | 14 | 21 | 27 | 30 | 31 |
| 0 | 100 | 0 | 0 | 2 | 2 | 3 | 4 | 5 |

TABLE 5

| Demulsifier (A1): | as in Table 1 |
| --- | --- |
| Demulsifying assistant (B3): | p-isononylphenol reacted with 5 mol of propylene oxide at from 120 to 140° C. under alkali metal catalysis |
| Crude oil emulsion: | North German III (water content: about 40% by weight) |
| Test temperature: | 50° C. |
| Added amount of mixtures of A1 and B3: | 100 ppm in each case |

| Mixtures of | | Separated amount of formation water [ml] | | | |
| --- | --- | --- | --- | --- | --- |
| A1 [% by weight] | B1 [% by weight] | 1 h | 2 h | 4 h | 16 h |
| 100 | 0 | 0 | 0 | 0 | 15 |
| 90 | 10 | 0 | 0 | 0 | 5 |
| 80 | 20 | 0 | 0 | 0 | 5 |
| 70 | 30 | 0 | 0 | 0 | 30 |
| 60 | 40 | 2 | 10 | 22 | 40 |
| 50 | 50 | 0 | 0 | 0 | 8 |
| 0 | 100 | 0 | 0 | 0 | 5 |

We claim:

1. A process for separating water from crude oil comprising adding to crude oil containing water an oil demulsifier comprising a mixture of
   A) compounds which have demulsifying activity and are of the structure type of the
   (a) polyethyleneimine alkoxylate,
   (b) mono- or oligoamine alkoxylate,
   (c) alkoxylated alkylphenol/formaldehyde resins,
   (d) alkoxylated amine-modified alkylphenol/formaldehyde resins,
   (e) co- or terpolymers of alkoxylated acrylates or methacrylates with vinyl compounds,
   (f) condensates of mono- or oligoamine alkoxylates, dicarboxylic acids and alkylene oxide block copolymers, where these condensates may furthermore be completely or partially quaternized at the nitrogen atoms, or (g) compounds (a) to (f) reacted with crosslinking agents and B) as a demulsifying assistant, a polyalkylene glycol ether which has no demulsifying activity and is of the formula I or II

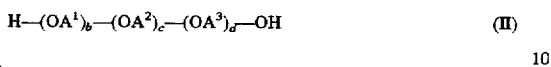

where

R$^1$ is a monovalent to decavalent C$_7$–C$_{20}$ alkyl group, phenyl group or alkylphenyl group where the alkyl radical is of 1 to 20 carbon atoms, A$^1$ to A$^3$ are each a 1,2-alkylene group of 2 to 4 carbon atoms or a phenylethylene group, and wherein at least one of A$^1$ to A$^3$ is a 1,2-alkylene group of 4 carbon atoms or a phenylethylene group, n is from 1 to 10, a is from 1 to 50 and b, c and d are each from 0 to 50, the sum of b+c+d being greater than 3.

2. A process for separating water from crude oil as claimed in claim 1, wherein the two components A and B are used in the mixture in a weight ratio of from 98:2 to 30:70.

3. An oil-demulsifying mixture comprising

A) compounds which have demulsifying activity and are of the structure type of the
(a) polyethyleneimine alkoxylate,
(b) mono- or oligoamine alkoxylate,
(c) alkoxylated alkylphenol/formaldehyde resins,
(d) alkoxylated amine-modified alkylphenol/formaldehyde resins,
(e) co- or terpolymers of alkoxylated acrylates or methacrylates with vinyl compounds,
(f) condensates of mono- or oligoamine alkoxylates, dicarboxylic acids and alkylene oxide block copolymers, where these condensates may furthermore be completely or partially quaternized at the nitrogen atoms, or
(g) compounds (a) to (f) reacted with crosslinking agents and B) as a demulsifying assistant, a polyalkylene glycol ether which has no demulsifying activity and is of the formula I or II

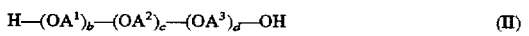

where

R$^1$ is a monovalent to decavalent C$_7$–C$_{20}$ alkyl group, phenyl group or alkylphenyl group where the alkyl radical is of 1 to 20 carbon atoms, A$^1$ to A$^3$ are each a 1,2-alkylene group of 2 to 4 carbon atoms or a phenylethylene group, and wherein at least one of A$^1$ to A$^3$ is a 1,2-alkylene group of 4 carbon atoms or a phenylethylene group, n is from 1 to 10, a is from 1 to 50 and b, c and d are each from 0 to 50, the sum of b+c+d being greater than 3, with the exception of mixtures of the components (a) and I.

* * * * *